(12) United States Patent
Kuramoto

(10) Patent No.: US 8,305,520 B2
(45) Date of Patent: Nov. 6, 2012

(54) LIGHT SOURCE DEVICE AND LIQUID CRYSTAL DISPLAY APPARATUS INCLUDING THE SAME

(75) Inventor: Satoshi Kuramoto, Kirishima (JP)

(73) Assignee: Kyocera Corporation, Kyoto (JP)

( * ) Notice: Subject to any disclaimer, the term of this patent is extended or adjusted under 35 U.S.C. 154(b) by 392 days.

(21) Appl. No.: 12/687,681

(22) Filed: Jan. 14, 2010

(65) Prior Publication Data

US 2010/0177263 A1 Jul. 15, 2010

(30) Foreign Application Priority Data

Jan. 15, 2009 (JP) ................................. 2009-6691
Jan. 12, 2010 (JP) ................................. 2010-3983

(51) Int. Cl.
*G02F 1/1335* (2006.01)
(52) U.S. Cl. ............................. 349/62; 349/65
(58) Field of Classification Search ...................... 349/62
See application file for complete search history.

(56) References Cited

U.S. PATENT DOCUMENTS

| | | | |
|---|---|---|---|
| 6,697,130 B2 * | 2/2004 | Weindorf et al. | ................. 349/65 |
| 7,270,464 B2 * | 9/2007 | Nakayoshi et al. | ............ 362/613 |
| 8,057,613 B2 * | 11/2011 | Kausch et al. | ................... 156/60 |
| 2006/0243948 A1 | 11/2006 | Ishiwa et al. | |
| 2010/0053995 A1 * | 3/2010 | Ohfuku et al. | ................. 362/613 |

FOREIGN PATENT DOCUMENTS

JP 2006-267936 A 10/2006
WO WO 2008129706 A1 * 10/2008

* cited by examiner

*Primary Examiner* — Michelle R Connelly
(74) *Attorney, Agent, or Firm* — Birch, Stewart, Kolasch & Birch, LLP

(57) ABSTRACT

A light source device according to one of the invention comprises a light emitting element; a light guide substrate into which light emitted from the light emitting element enters; a mounting substrate on which the light emitting element is mounted; and a conductive pattern for removing a static electricity in or on the light guide substrate, formed on the mounting substrate.

7 Claims, 11 Drawing Sheets

LIGHT SOURCE DEVICE AND LIQUID CRYSTAL DISPLAY APPARATUS INCLUDING THE SAME

CROSS REFERENCE TO RELATED APPLICATION(S)

The present application claims priority under 35 U.S.C. §119 to Japanese Patent Application No. 2009-006691, filed Jan. 15, 2009, entitled "LIGHT SOURCE DEVICE AND LIQUID CRYSTAL DISPLAY APPARATUS INCLUDING LIGHT SOURCE DEVICE", the entirety of which is incorporated by reference herein. The present application also claims priority under 35 U.S.C. §119 to Japanese Patent Application No. 2010-3983, filed on Jan. 12, 2010, entitled "LIGHT SOURCE DEVICE AND LIQUID CRYSTAL DISPLAY APPARATUS INCLUDING THE SAME" the entirety of which is incorporated by reference herein.

BACKGROUND OF THE INVENTION

1. Field of the Invention

The present invention relates to a light source device and a liquid crystal display apparatus including the same.

2. Description of the Related Art

Light source devices used in liquid crystal display apparatuses include an edge light type in view of low power consumption (refer to, for example, Japanese Unexamined Patent Application Publication No. 2006-267936).

As a material for a light guide substrate, an insulator, such as acrylic resin or polycarbonate resin, is typically used. Accordingly, if a light guide substrate rubs against something such as a component, the light guide substrate may be charged due to the friction. For example, in a case that a light source device is incorporated in a mobile terminal with a vibration function or in an industrial apparatus, using the vibration function or driving the industrial apparatus may cause static electricity to be accumulated in or on the light guide substrate. The accumulated static electricity may adversely affect the light source device. Particularly, if a light source is a light emitting diode (LED) as disclosed in Japanese Unexamined Patent Application Publication No. 2006-267936, the adverse effect may be increased because the LED has a low withstand voltage against a static electricity.

SUMMARY OF THE INVENTION

The present invention has been made in consideration of the above-described problems. Accordingly, it is an object of the present invention to provide a light source device with less adverse effects, caused by a static electricity, on a light emitting element and a liquid crystal display apparatus including the light source device.

According to an embodiment of the present invention, a light source device includes a light emitting element and a light guide substrate into which light emitted from the light emitting element enters. The light source device also includes a mounting substrate on which the light emitting element is mounted and a conductive pattern for removing a static electricity in or on the light guide substrate.

According to another embodiment of the present invention, a liquid crystal display apparatus includes the light source device and a liquid crystal display panel facing the light guide substrate in the light source device.

BRIEF DESCRIPTION OF THE DRAWINGS

FIG. 1A is a plan view of the device, and FIG. 1B is a cross-sectional view thereof taken along the line IB-IB.

FIG. 2A is a plan view of these components, and FIG. 2B is an equivalent circuit diagram of the components in FIG. 2A.

FIG. 3A is a plan view of these components, and FIG. 3B is an enlarged cross-sectional view of essential part of the device taken along the line IIIB-IIIB.

FIG. 5A is a plan view of these components, and FIG. 5B is an equivalent circuit diagram of the components in FIG. 5A.

FIG. 6A is a schematic cross-sectional view of the light source device, and FIG. 6B is a schematic plan view of light emitting elements, a mounting substrate, and a light guide substrate in the light source device shown in FIG. 6A.

DESCRIPTION OF THE PREFERRED EMBODIMENTS

First Embodiment

Figure 1A:
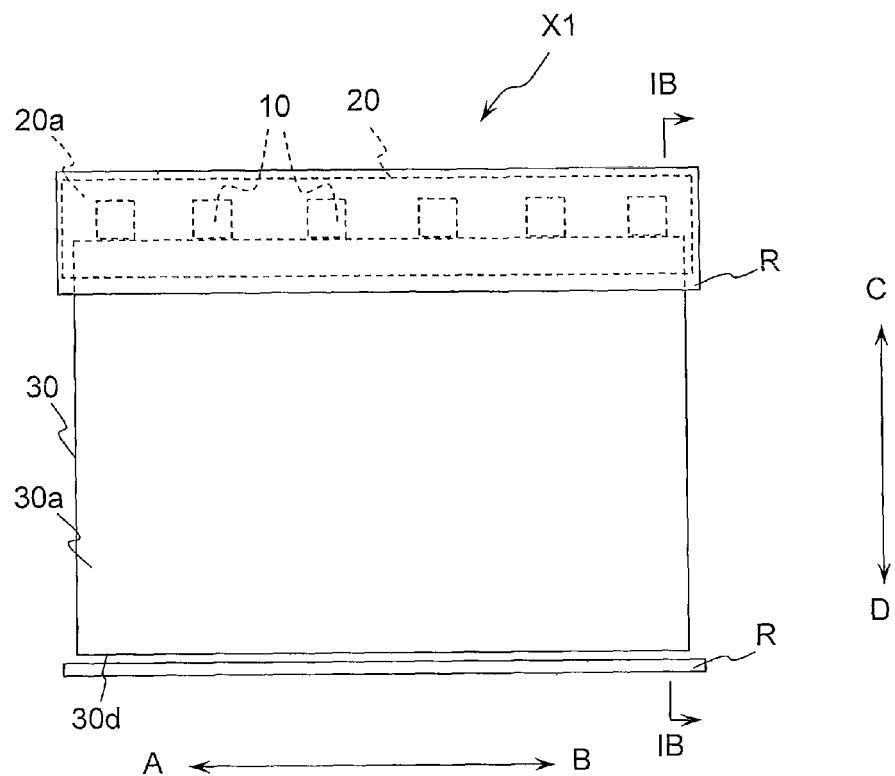
FIGS. 1A and 1B are schematic diagrams illustrating a light source device according to a first embodiment of the present invention.
Figure 1B:
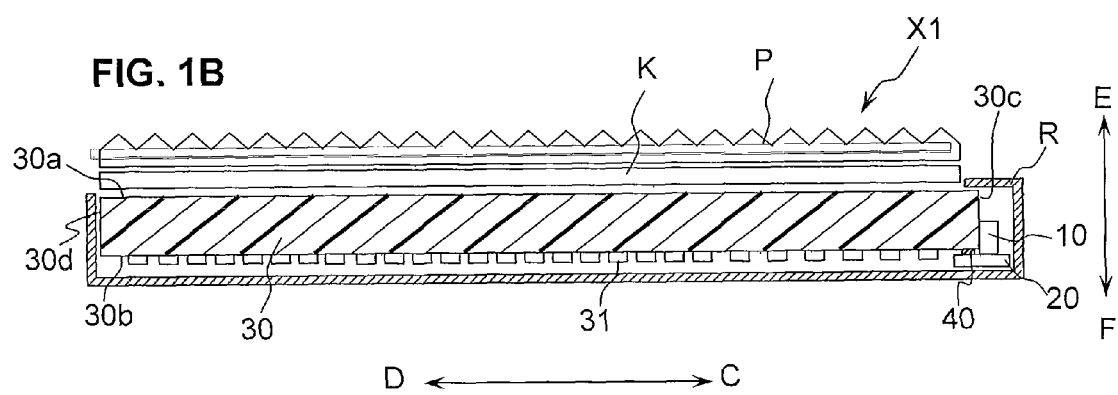
Figure 2A:
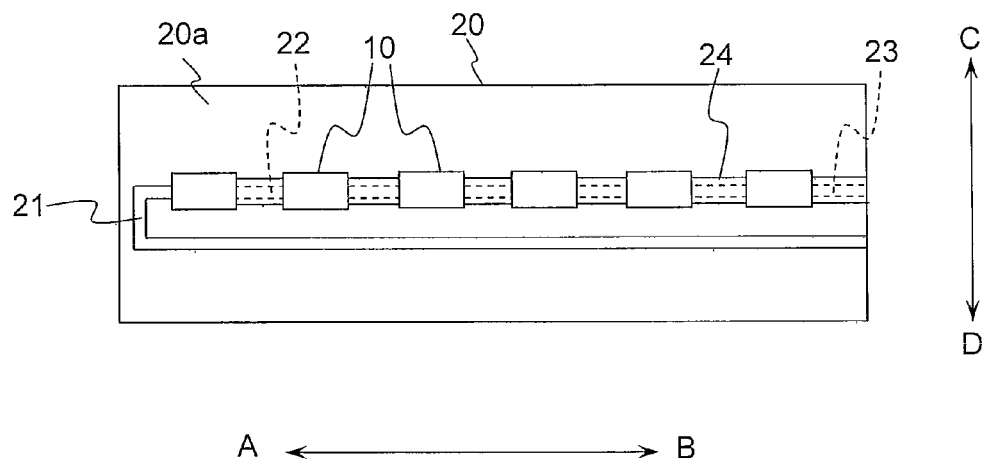
FIGS. 2A and 2B are schematic diagrams illustrating light emitting elements and a mounting substrate in the light source device shown in FIGS. 1A and 1B.
Figure 2B:
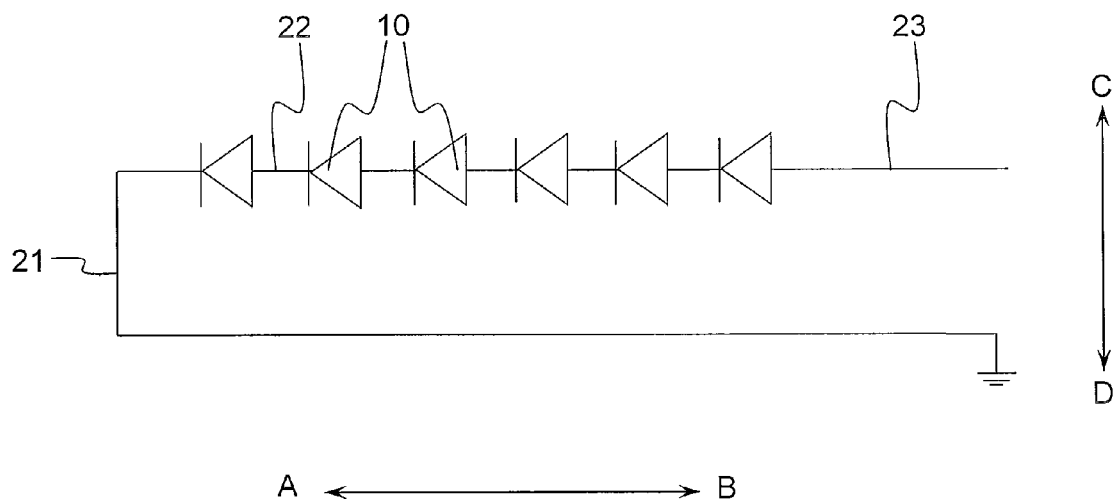

FIGS. 1A and 1B illustrate a light source device X1. The light source device X1 includes light emitting elements 10, a mounting substrate 20, a light guide substrate 30, a joining member 40 which serves as a conductive intermediate layer, a reflector R, a diffuser K, and a prism P. In the light source device X1, light emitted from the light emitting elements 10 is guided to an object to be irradiated (e.g., a liquid crystal display panel) through the light guide substrate 30. FIG. 2A is a schematic plan view illustrating the light emitting elements 10 and the mounting substrate 20 in the light source device X1. FIG. 2B is an equivalent circuit diagram of the components in FIG. 2A.

Each light emitting element 10 serves as a member which emits light to the light guide substrate 30. The plurality of (in FIG. 1A, six) light emitting elements 10 are arranged in the direction shown by the arrow AB (hereinafter, referred to as "arrow AB direction"). For the light emitting elements 10, for example, LEDs or electro-luminescence (EL) elements are used. It is preferable that the light emitting elements 10 be LEDs since low power consumption and a reduction in noise can be achieved.

The mounting substrate 20 serves as a member on which the light emitting elements 10 are mounted. The mounting substrate 20 has a conductive pattern 21, as shown in FIG. 2A. Although the mounting substrate 20 has a rectangular parallelepiped shape such that the substrate has an upper surface 20a on which the light emitting elements 10 are mounted, the shape of the mounting substrate 20 is not limited to the above shape. A material for the mounting substrate 20 includes an insulating resin, such as glass epoxy resin.

Figure 3A:
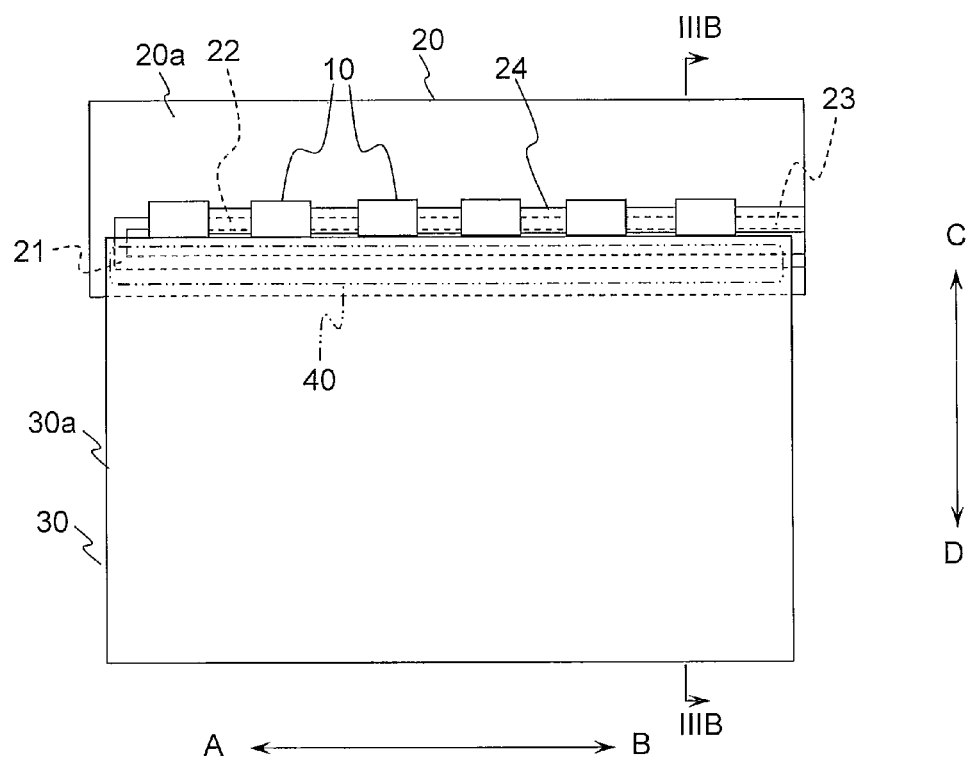
FIGS. 3A and 3B are schematic diagrams illustrating the light emitting elements, the mounting substrate, and a light guide substrate in the light source device in FIGS. 1A and 1B.
Figure 3B:
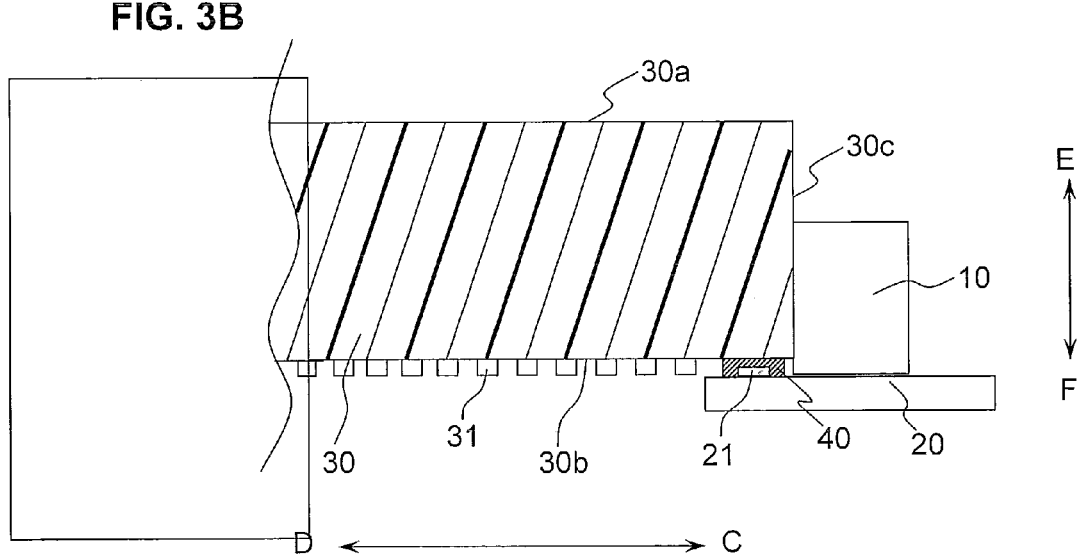

FIGS. 3A and 3B are schematic diagrams illustrating the light emitting elements 10, the mounting substrate 20, and the light guide substrate 30 in the light source device X1. FIG. 3A is a plan view of the components and FIG. 3B is an enlarged cross-sectional view of essential part of the device taken along the line IIIB-IIIB in FIG. 3A.

The conductive pattern 21 serves as a member which removes a static electricity in or on the light guide substrate 30. Accordingly, the conductive pattern 21 is set to a reference potential, e.g., the ground potential. In the present embodiment, as shown in FIGS. 2A and 2B, the conductive pattern 21 is connected to the light emitting element 10. Furthermore, in the present embodiment, as shown in FIGS. 2A and 3A, the conductive pattern 21 is exposed on the upper surface 20a of the mounting substrate 20 such that the conductive pattern 21 extends in parallel to the direction in which the light emitting elements 10 are arranged.

Since the conductive pattern 21 is disposed in parallel to the arrangement of the light emitting elements 10, the following effects are obtained: Adverse effects on the light emitting elements 10 caused by the static electricity in or on the light guide substrate 30 can be reduced. Heat distribution on a light entrance surface 30c of the light guide substrate 30 in the arrow AB direction is uniformed, thus reducing the occurrence of distortion in the light entrance surface 30c caused by a difference in thermal expansion.

A material for the conductive pattern 21 includes, for example, aluminum, gold, silver, copper or combination thereof. Among those materials, copper is preferable because it exhibits excellent economical efficiency and excellent thermal conductivity. In other words, when the conductive pattern 21 is made of copper, the manufacturing cost of the light source device X1 is reduced and heat transmitted through the light guide substrate 30 is more easily dissipated through the conductive pattern 21.

The mounting substrate 20 further includes circuit patterns 22 and 23 for driving the light emitting elements 10. The circuit pattern 22 connects the light emitting elements 10 to each other. The circuit pattern 23 is connected to the light emitting element 10 and is also connected to a driving power source (not shown). Since the circuit patterns 22 and 23 are covered with an insulating layer 24, the adverse effects by the static electricity on the light emitting elements 10 can be further reduced.

It is preferred that the conductive pattern 21 be positioned closer to the light guide substrate 30 than the circuit patterns 22 and 23, as viewed in plan, as shown in FIG. 3A. This arrangement can allow the static electricity in or on the light guide substrate 30 to be dissipated to the conductive pattern 21 before the static electricity adversely affects the circuit patterns 22 and 23.

The light guide substrate 30 serves as a member which guides light emitted from the light emitting elements 10 to an object to be irradiated (hereinafter, referred to as "irradiation object"). As a material for the light guide substrate 30, for example, a light-transmissive material, such as acrylic resin or polycarbonate resin, is used. Light-transmissivity means a property of transmitting visible light. In the present embodiment, although the light guide substrate 30 has a rectangular parallelepiped shape such that the substrate has an upper surface 30a, a lower surface 30b and the light entrance surface 30c, the shape of the light guide substrate 30 is not limited to the above shape. The upper surface 30a is a surface from which light transmitting through the light guide substrate 30 exits toward an irradiation object. The lower surface 30b is opposite the upper surface 30a. Light diffusers 31 are arranged on the lower surface 30b. The light entrance surface 30c is a surface which light emitted from the light emitting elements 10 enters. The light entrance surface 30c faces the light emitting elements 10.

In the present embodiment, as shown in FIG. 3B, an end portion in the lower surface 30b adjacent to the light entrance surface 30c of the light guide substrate 30 faces the conductive pattern 21 on the mounting substrate 20, with the joining member 40 therebetween. In the present embodiment, the light entrance surface 30c corresponds to one side surface of the light guide substrate 30. The light entrance surface 30c is not limited to one side surface. If the light emitting elements 10 are arranged so as to face two or more side surfaces of the light guide substrate 30, the light guide substrate 30 may have a plurality of light entrance surfaces 30c.

The joining member 40 serves as a member which joins the light guide substrate 30 to the mounting substrate 20. Specifically, the joining member 40 has electrical conductivity and thermal conductivity, and joins the light guide substrate 30 to the mounting substrate 20 so as to cover the conductive pattern 21 disposed on the mounting substrate 20. Since the joining member 40 is interposed between the conductive pattern 21 and the light guide substrate 30, thermal conductivity between the light guide substrate 30 and the conductive pattern 21 is increased. Thus, heat in the vicinity of the light entrance surface 30c of the light guide substrate 30 can be dissipated by the conductive pattern 21. As a material for the joining member 40, for example, a resin, such as epoxy resin, is used. It is preferable that the joining member 40 comprise a resin containing metal particles of copper or aluminum. The reason is that the metal particles contained in the resin allow the static electricity in or on the light guide substrate 30 to be easily dissipated and also allow heat in the light guide substrate 30 to be easily transferred to the conductive pattern 21.

It is preferable that the joining member 40 be white. This can reduce color effects on illumination light emitted through the light guide substrate 30 by light reflected from the conductive pattern 21 to the light guide substrate 30. In this description, "white" is not limited to pure white but may include silver white, reddish white, blackish white, bluish white, and gold white. The term "white" means a color included in the white color region shown in the chromaticity diagram of Table 1 in JIS Z 8110-1995(ICS 17.180.20). As means for reducing color effects, the surface on which the conductive pattern 21 is exposed may be covered with a surface layer that comprises solder or another metal with little color effects. Alternatively, the surface layer may be made rough in order to scatter light.

The light diffusers 31 serve as members which diffuse light entering through the light guide substrate 30. The light diffusers 31 are arranged in a portion (in the present embodiment, the lower surface 30b) other than a light exit area and side surfaces of the light guide substrate 30. The light diffusers 31 are dot-shaped members arranged in a predetermined pattern. The shape of each light diffuser 31 is not limited to the above shape. For example, predetermined shaped grooves (irregularities) may be formed in the lower surface 30b of the light guide substrate 30. Alternatively, the lower surface 30b may be inclined relative to the upper surface 30a. As each dot-shaped member, a cylindrical member that is circular as viewed in plan is used. The shape of the member is not limited to the above one. A hemispherical member that is circular as viewed in plan or a cylindrical member that is oval as viewed in plan may be used.

The reflector R serves as a member which reflects light exited from a portion 30b, 30c, and 30d excluding the upper surface 30a of the light guide substrate 30 toward the light guide substrate 30. A material for the reflector R includes, for example, white foam made by extending a polyethylene terephthalate (PET) material, a silver-coated base comprising a PET material, a laminate including a base comprising a PET material and a dielectric film disposed on the base, or metal, such as aluminum or stainless steel (SUS).

The diffuser K serves as a member which increases the evenness of the intensity of light emerged from the upper surface 30a of the light guide substrate 30 toward an irradiation object. The diffuser K is disposed so as to face the upper surface 30a of the light guide substrate 30. A material for the diffuser K includes, for example, a sheet made by hardening a resin containing silica beads on a base comprising a resin material, such as PET, or a sheet made by mixing silica beads with a resin material, such as polycarbonate (PC). The diffuser K is not illustrated in FIG. 1A.

The prism P serves as a member which refracts incident light. The prism P refracts light incident in the prism P so that the light exits in the direction, indicated by the arrow E, substantially perpendicular to the upper surface 30a of the light guide substrate 30. The prism P may be made by, for example, laminating a prism structure made of an acrylic material on a base comprising a resin material, such as PET, alternatively, forming a base comprising a resin material, such as PC, as a prism structure. The prism P is not illustrated in FIG. 1A.

As described above, in the light source device X1 according to the present embodiment, the mounting substrate 20 is provided with the conductive pattern 21 for removing a static electricity in or on the light guide substrate 30. Accordingly, a static electricity in or on the light guide substrate 30 can be dissipated to the conductive pattern 21. Consequently, the light source device X1 can reduce adverse effects on the light emitting elements 10 caused by discharge of the static electricity in or on the light guide substrate 30.

Second Embodiment

Figure 4:
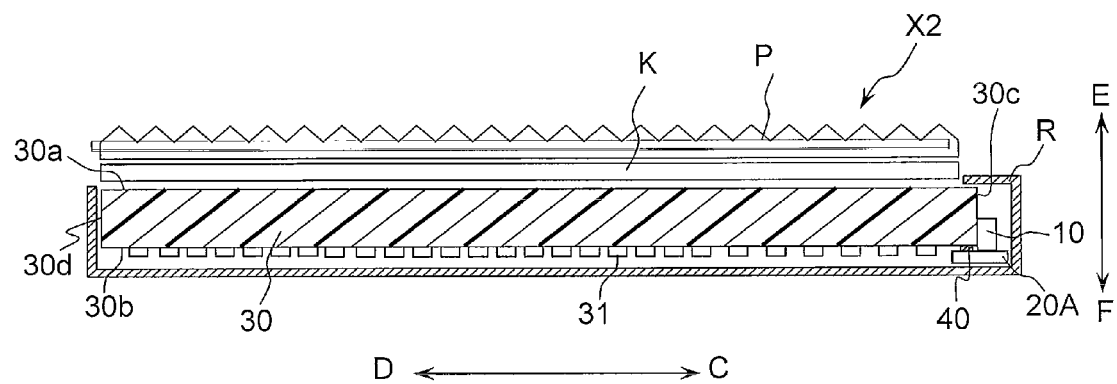
FIG. 4 is a schematic cross-sectional view of a light source device according to a second embodiment of the present invention.
Figure 5A:
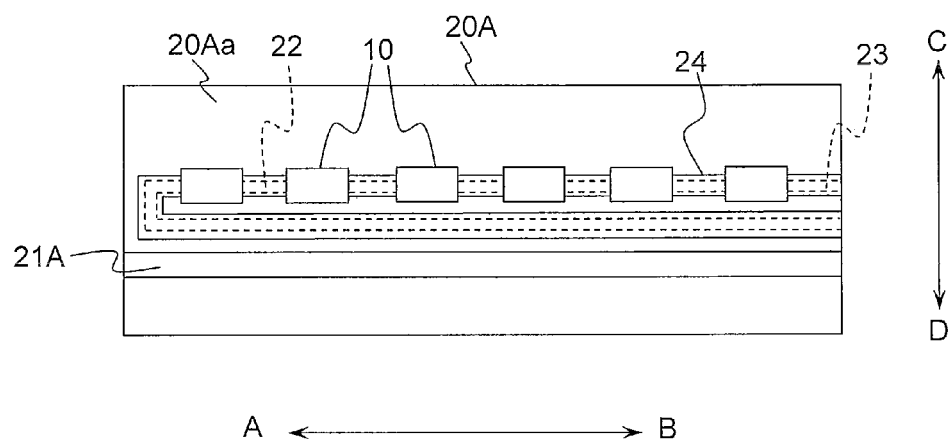
FIGS. 5A and 5B are schematic diagrams illustrating light emitting elements and a mounting substrate in the light source device shown in FIG. 4.
Figure 5B:
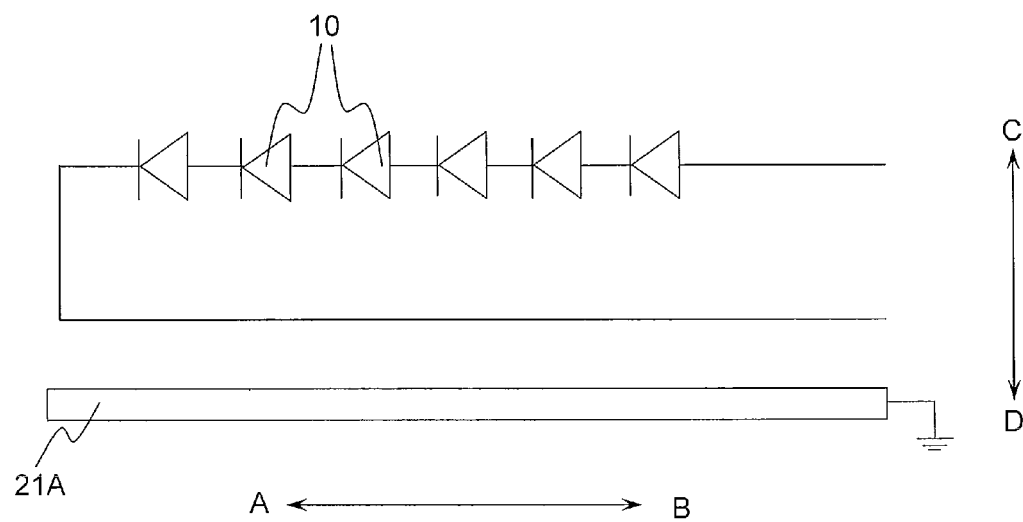

FIG. 4 is a schematic cross-sectional view of a light source device X2 according to a second embodiment of the present invention. The light source device X2 differs from the light source device X1 in that a mounting substrate 20A is used instead of the mounting substrate 20. FIG. 5A is a schematic plan view illustrating light emitting elements 10 and the mounting substrate 20A in the light source device X2. FIG. 5B is an equivalent circuit diagram of the components in FIG. 5A.

The mounting substrate 20A serves as a member on which the light emitting elements 10 are mounted. Referring to FIG. 5A, the mounting substrate 20A has a conductive pattern 21A. The mounting substrate 20A has a rectangular parallelepiped shape such that the substrate has an upper surface 20Aa on which the light emitting elements 10 are mounted. The shape of the mounting substrate 20A is not limited to the above one. As a material for the mounting substrate 20A, an insulating resin, such as glass epoxy resin, is preferably used.

The conductive pattern 21A serves as a member which removes a static electricity in or on a light guide substrate 30 in a manner similar to the conductive pattern 21. Accordingly, the conductive pattern 21A is set to a reference potential, e.g., the ground potential. The conductive pattern 21A differs from the conductive pattern 21 in that the conductive pattern 21A is not connected to the light emitting element 10 and is separated from circuit patterns 22 and 23. Specifically, the conductive pattern 21A is disposed on the upper surface 20Aa of the mounting substrate 20A such that the conductive pattern 21A extends in parallel to the circuit patterns 22 and 23. Accordingly, the light source device X2 can easily dissipate the static electricity in or on the light guide substrate 30 to the conductive pattern 21A, as compared with the light source device X1. Consequently, the light source device X2 can further reduce adverse effects on the light emitting elements 10 caused by the static electricity in or on the light guide substrate 30, as compared with the light source device X1.

Third Embodiment

Figure 6A:
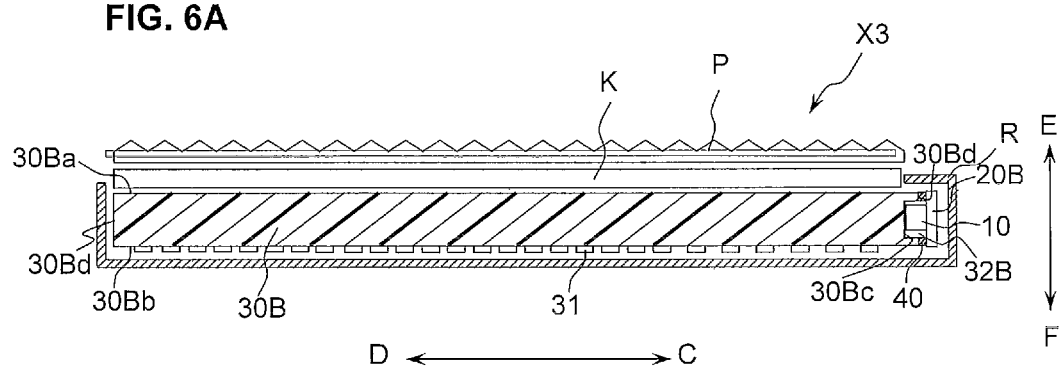
FIGS. 6A and 6B are schematic diagrams illustrating a light source device according to a third embodiment of the present invention.
Figure 6B:
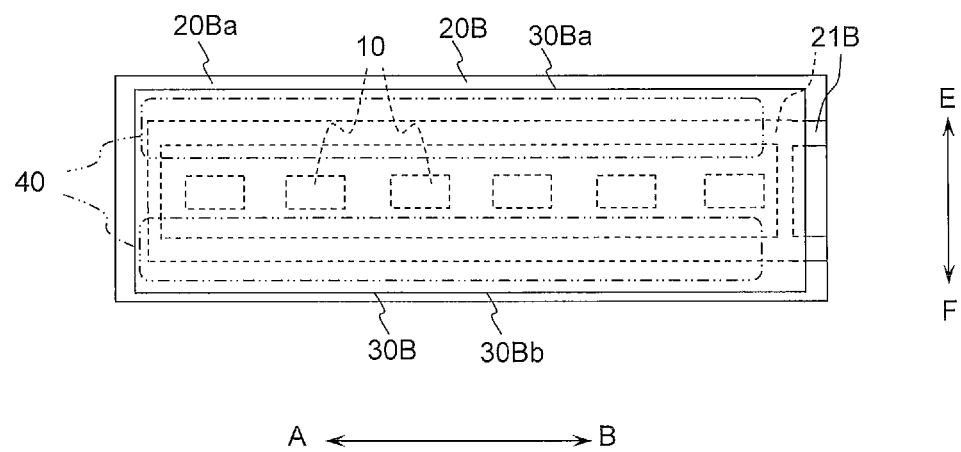

FIG. 6A is a schematic cross-sectional view of a light source device X3 according to a third embodiment of the present invention. The light source device X3 differs from the light source device X1 in that a mounting substrate 20B is used instead of the mounting substrate 20 and a light guide substrate 30B is used instead of the light guide substrate 30. FIG. 6B is a schematic plan view illustrating light emitting elements 10 and the mounting substrate 20B in the light source device X3.

The mounting substrate 20B serves as a member on which the light emitting elements 10 are mounted. Referring to FIG. 6B, the mounting substrate 20B has a conductive pattern 21B. The mounting substrate 20B has a rectangular parallelepiped shape such that the substrate has an upper surface 20Ba on which the light emitting elements 10 are mounted. The shape of the mounting substrate 20B is not limited to the above one. As a material for the mounting substrate 20B, for example, an insulating resin, such as glass epoxy resin, is preferably used.

The conductive pattern 21B serves as a member which removes a static electricity in or on the light guide substrate 30B in a manner similar to the conductive pattern 21. Accordingly, the conductive pattern 21B is set to a reference potential, e.g., the ground potential. The conductive pattern 21B differs from the conductive pattern 21 in that the conductive pattern 21B is not connected to the light emitting element 10 and is separated from circuit patterns 22 and 23. Although the circuit patterns 22 and 23 are not shown in FIG. 6B, the circuit patterns 22 and 23 are actually arranged in the upper surface 20Ba of the mounting substrate 20B so as to connect the light emitting elements 10 to each other. In the present embodiment, the conductive pattern 21B is disposed on the upper surface 20Ba of the mounting substrate 20B so as to surround the light emitting elements 10.

The light guide substrate 30B serves as a member which guides light emitted from the light emitting elements 10 to an irradiation object. A material for the light guide substrate 30B includes, for example, a light-transmissive material, such as acrylic resin or polycarbonate resin. The light guide substrate 30B has a rectangular parallelepiped shape such that the substrate has an upper surface 30Ba, a lower surface 30Bb, a light entrance surface 30Bc, and a first side surface 30Bd. The shape of the light guide substrate 30B is not limited to the above one. The upper surface 30Ba is a surface from which light transmitting through the light guide substrate 30B is emerged toward an irradiation object. The lower surface 30Bb is opposite the upper surface 30Ba. Light diffusers 31 are arranged on the lower surface 30Bb. The first side surface 30Bd is a side surface on the side indicated by the arrow C. The first side surface 30Bd has a groove 32B which receives the light emitting elements 10. In addition, the first side surface 30Bd is connected to the mounting substrate 20B. The light entrance surface 30Bc is a surface which light emitted from the light emitting elements 10 enters. The light entrance surface 30Bc faces the light emitting elements 10. The light emitting elements 10 are arranged within the groove 32B of the light guide substrate 30B.

Specifically, the conductive pattern 21B is disposed on the upper surface 20Ba of the mounting substrate 20B so as to surround the light emitting elements 10. Accordingly, the light source device X3 can easily dissipate a static electricity in or on the light guide substrate 30B to the conductive pattern 21B, as compared with the light source device X1. Consequently, the light source device X3 can further reduce adverse effects on the light emitting elements 10 caused by the static electricity in or on the light guide substrate 30B, as compared with the light source device X1.

Structure of Liquid Crystal Display Apparatus

Figure 7:
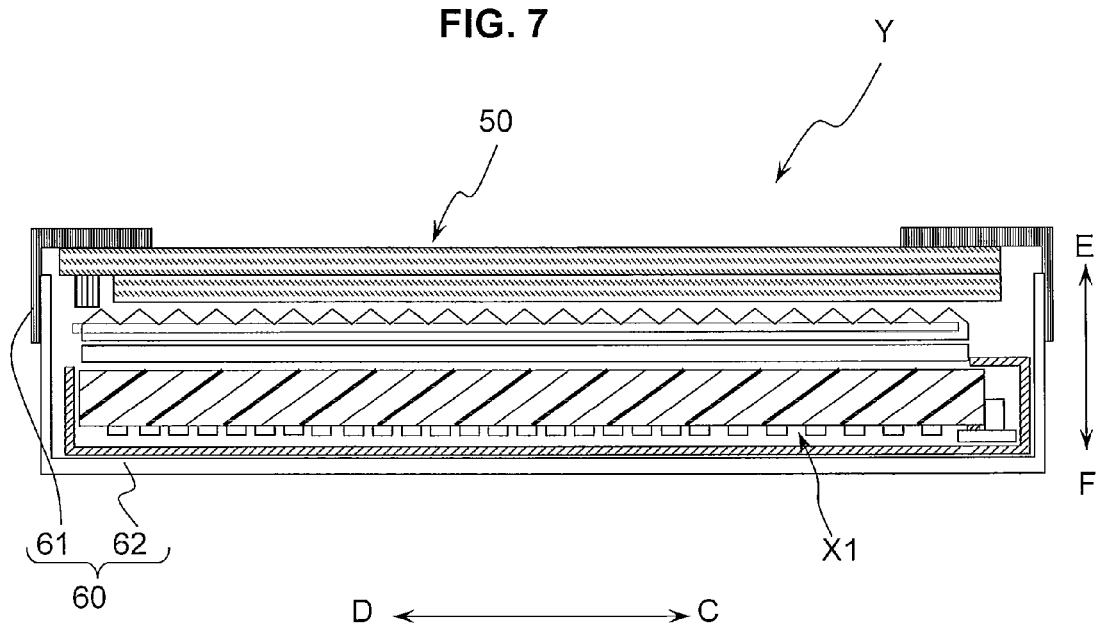
FIG. 7 is a schematic cross-sectional view of a liquid crystal display apparatus according to an embodiment of the present invention.
Figure 8:
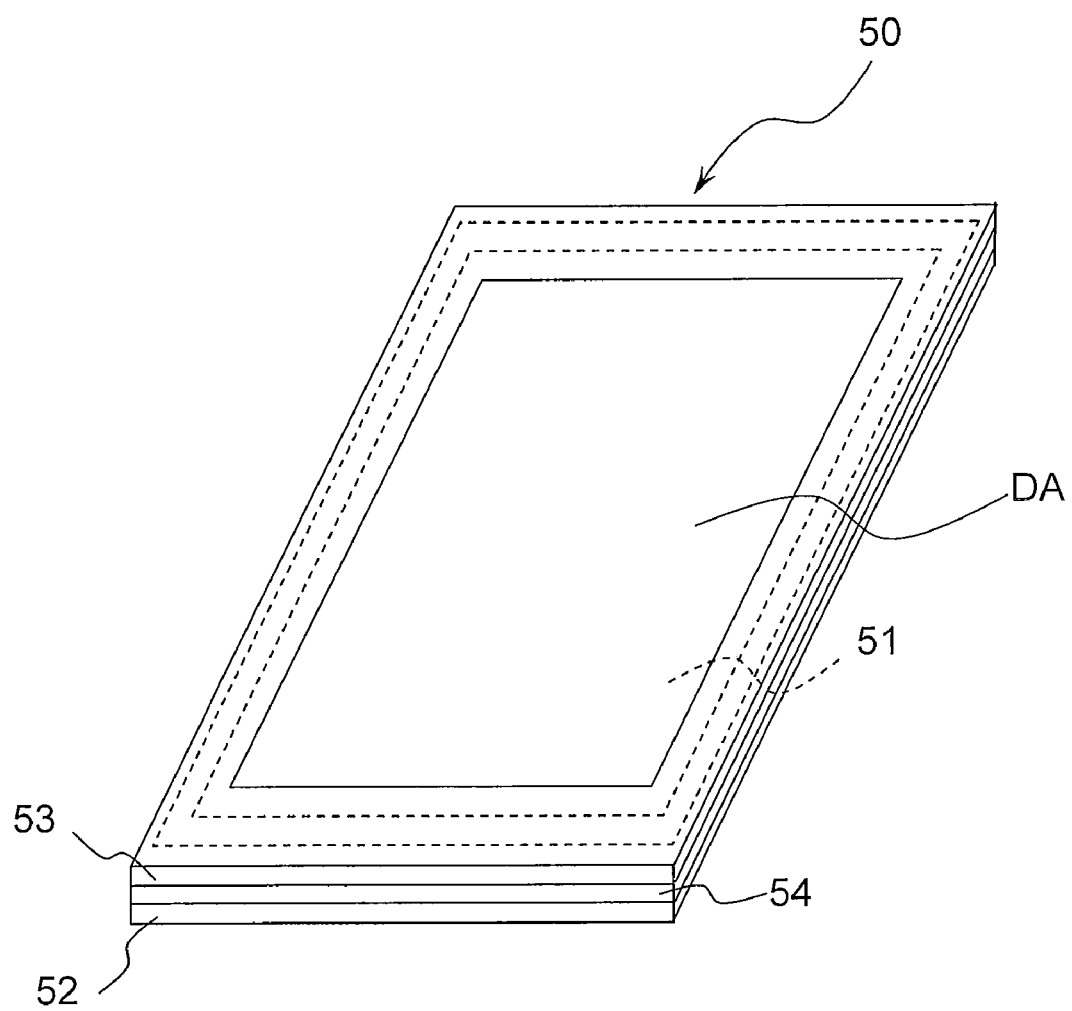
FIG. 8 is a schematic perspective view of a liquid crystal display panel in the liquid crystal display apparatus shown in FIG. 7.

FIG. 7 is a schematic cross-sectional of a liquid crystal display apparatus Y including the light source device X1 according to the first embodiment of the present invention. The liquid crystal display apparatus Y includes the light source device X1, a liquid crystal display panel 50, and a casing 60. When the liquid crystal display apparatus Y includes the light source device X2 or X3 instead of the light source device X1, the liquid crystal display apparatus Y has the same structure. FIG. 8 is a schematic perspective view of the liquid crystal display panel 50 in the liquid crystal display apparatus Y of FIG. 7.

Referring to FIG. 8, the liquid crystal display panel 50 includes a liquid crystal layer 51, a first base 52, a second base 53, and a seal 54. The liquid crystal layer 51 is interposed between the first base 52 and the second base 53 and the liquid crystal layer 51 is enclosed by the seal 54, thus forming a display area DA that includes a plurality of pixels for image display.

The casing 60 serves as a member which receives the light source device X1. The casing 60 includes an upper frame 61 and a lower frame 62. As a material for the casing 60, for example, a resin, such as polycarbonate resin, or a metal, such as aluminum or stainless steel (SUS), is used.

Since the liquid crystal display apparatus Y includes the light source device X1, the liquid crystal display apparatus Y can enjoy the above-described advantages of the light source device X1. Disadvantages, e.g., the occurrence of unevenness of intensity of irradiation light and a decrease in intensity, caused by a static electricity can therefore be reduced. For example, even when the liquid crystal display apparatus Y is vibrated, high display quality can be kept.

Although the embodiments of the present invention have been described, the present invention is not limited to the embodiments.

Although each of the light source devices X1, X2, and X3 includes the reflector R, the light source device may include no reflector R.

Although the circuit patterns 22 and 23 for driving the light emitting elements 10 are covered with the insulating layer 24 in each of the light source devices X1, X2, and X3, it is unnecessary to cover the circuit patterns 22 and 23 with the insulting layer 24.

As the conductive patterns 21, 21A, 21B of the light source devices X1, X2, and X3, at least part of the conductive pattern may be exposed.

As for the conductive patterns 21, 21A, 21B of the light source devices X1, X2, and X3, the conductive pattern may be in direct contact with the light guide substrate 30 or 30B without the joining member 40 therebetween. With this arrangement, a static electricity in or on the light guide substrate (30, 30B) can be easily dissipated to the conductive pattern (21, 21A, 21B).

Figure 9:
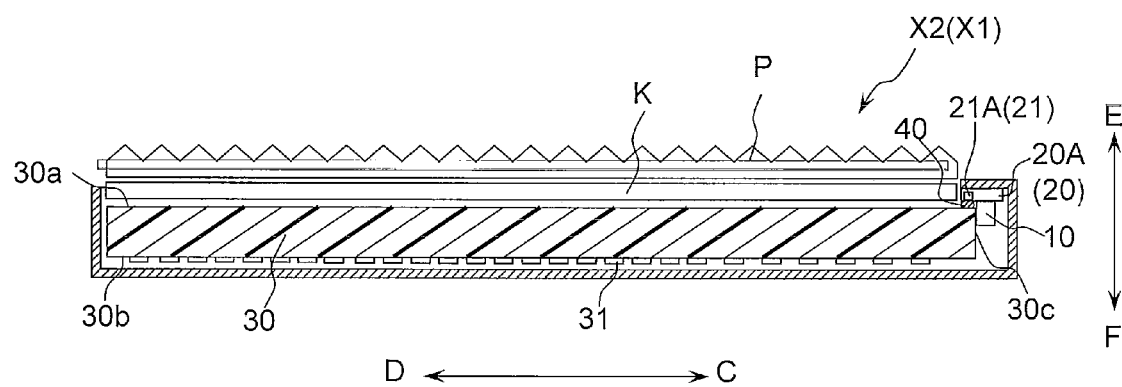
FIG. 9 is a schematic cross-sectional view of a light source device according to a modification of the embodiments.

In each of the light source devices X1 and X2, the lower surface 30$b$ of the light guide substrate 30 faces the conductive pattern (21, 21A) of the mounting substrate (20, 20A). As shown in FIG. 9, the upper surface 30$a$ of the light guide substrate 30 may face the conductive pattern (21, 21A) of the mounting substrate (20, 20A).

Figure 10:
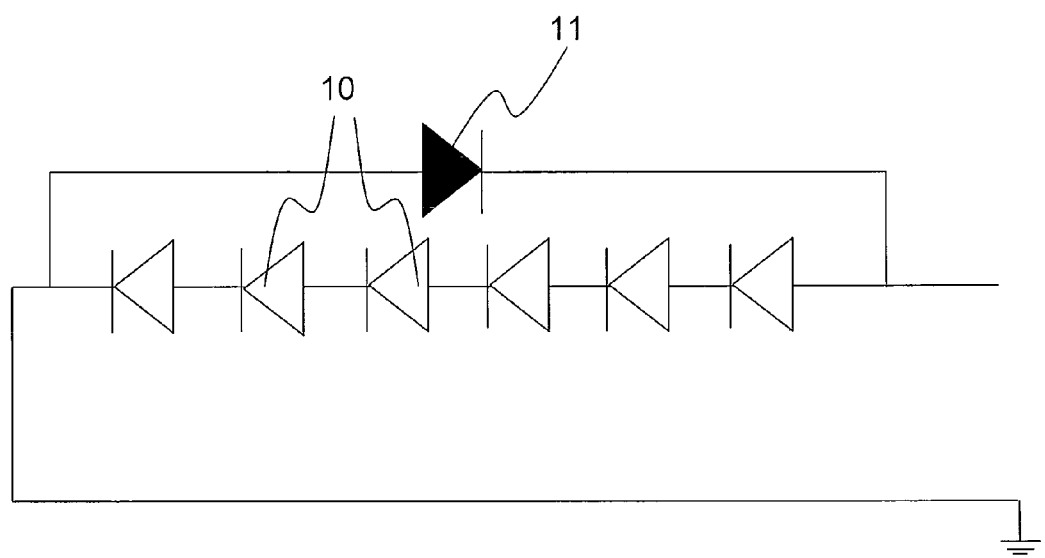
FIG. 10 is an equivalent circuit diagram of a driving circuit for light emitting elements in a light source device according to a modification of the embodiments.
Figure 11A:
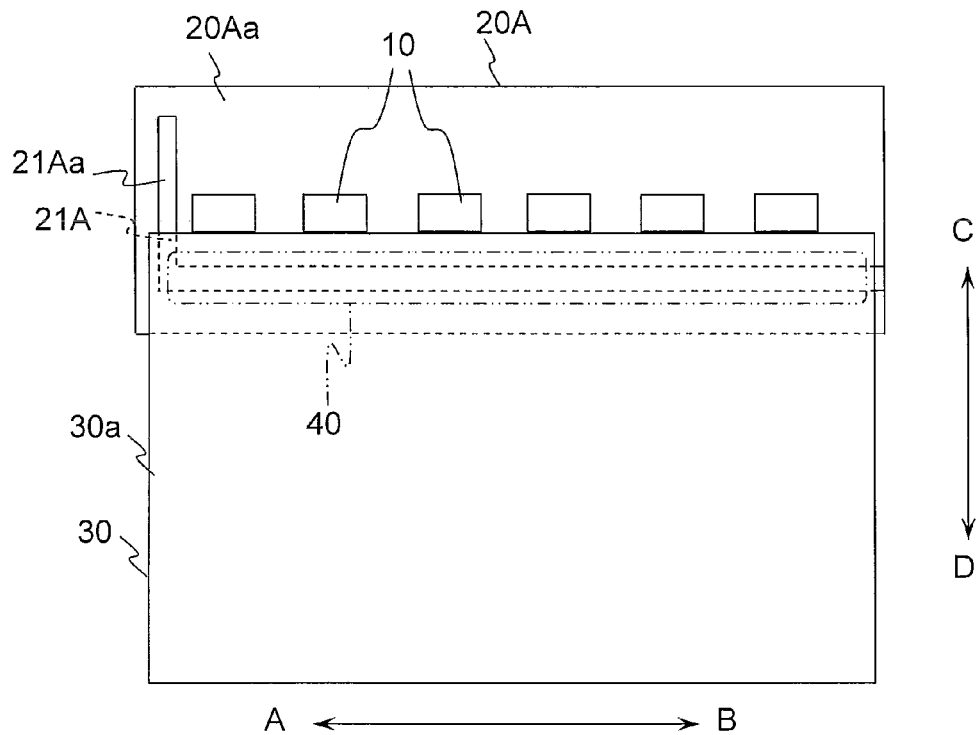
FIGS. 11A and 11B are schematic plan views each illustrating light emitting elements, a mounting substrate, and a light guide substrate in a light source device according to a modification of the embodiments.
Figure 11B:
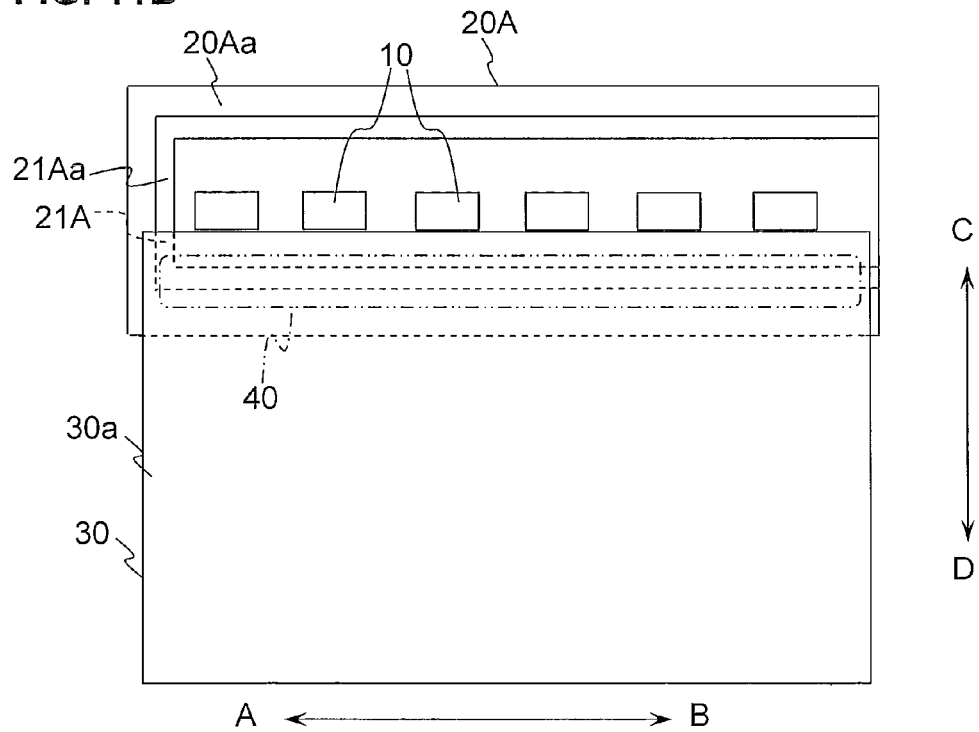

In each of the light source devices X1, X2, and X3, a zener diode 11 may be connected in parallel to the light emitting elements 10, as shown in FIG. 10. With this arrangement, adverse effects on the light emitting elements 10 caused by a static electricity can be further reduced.

As for the conductive patterns 21A of the mounting substrates 20A in the light source devices X2 may include a portion 21Aa that does not face the light guide substrate 30. With this arrangement, the portion 21Aa can further dissipate heat generated in the vicinity of the light entrance surface 30$c$ of the light guide substrate 30.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims. Terms and phrases used in this document, and variations thereof, unless otherwise expressly stated, should be construed as open ended as opposed to limiting. As examples of the foregoing: the term "include" should be read as mean "include, without limitation" or the like; the term "example" is used to provide exemplary instances of the item in discussion, not an exhaustive or limiting list thereof.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:
1. A light source device comprising:
a light emitting element;
a light guide substrate into which light emitted from the light emitting element enters;
a mounting substrate on which the light emitting element is mounted; and a conductive pattern for removing a static electricity in or on the light guide substrate, formed on the mounting substrate, wherein the conductive pattern is connected to the light guide substrate via a conductive intermediate layer, and the conductive intermediate layer comprising a resin portion, and metal particles in the resin portion.

2. The light source device according to claim 1, wherein the conductive pattern is set to be a reference potential.

3. The light source device according to claim 1, further comprising:

a circuit pattern for driving the light emitting element, formed on the mounting substrate;

wherein a plan view, the conductive pattern is closer to the light guide substrate than the circuit pattern.

4. The light source device according to claim 1, wherein the color of the conductive intermediate layer is white.

5. The light source device according to claim 1, wherein the light emitting element is an LED.

6. The light source device according to claim 1, wherein the light emitting element is electrically connected to a zener diode in parallel.

7. A liquid crystal display apparatus comprising:

the light source device according to claim 1; and a liquid crystal display panel facing the light guide substrate in the light source device.

* * * * *